United States Patent [19]

Krueger et al.

[11] Patent Number: 5,999,950

[45] Date of Patent: Dec. 7, 1999

[54] JAPANESE TEXT INPUT METHOD USING A KEYBOARD WITH ONLY BASE KANA CHARACTERS

[75] Inventors: Mark Henry Krueger, Fukuoka, Japan; Kevin Daniel Neeson, San Francisco, Calif.

[73] Assignee: WebTV Networks, Inc., Mountain View, Calif.

[21] Appl. No.: 08/909,178

[22] Filed: Aug. 11, 1997

[51] Int. Cl.[6] ..................................................... G06F 17/00
[52] U.S. Cl. ........................ 707/535; 707/526; 707/530; 707/531
[58] Field of Search ......................................... 707/1–542

[56] References Cited

U.S. PATENT DOCUMENTS

| | | | |
|---|---|---|---|
| 4,410,957 | 10/1983 | Cason et al. | 364/900 |
| 4,498,143 | 2/1985 | Strzelecki | 707/535 |
| 4,544,276 | 10/1985 | Horodeck | 400/110 |
| 4,559,615 | 12/1985 | Goo et al. | 364/900 |
| 4,680,729 | 7/1987 | Steinhart | 364/900 |
| 4,777,600 | 10/1988 | Saito et al. | 707/535 |
| 4,879,653 | 11/1989 | Shinoto | 707/535 |
| 5,181,029 | 1/1993 | Kim | 241/20 |
| 5,245,321 | 9/1993 | Franz et al. | 345/172 |
| 5,258,748 | 11/1993 | Jones | 345/172 |
| 5,319,386 | 6/1994 | Gunn et al. | 345/173 |
| 5,387,042 | 2/1995 | Brown | 400/477 |
| 5,535,119 | 7/1996 | Ito et al. | 364/419.03 |
| 5,623,261 | 4/1997 | Rose | 341/26 |
| 5,631,643 | 5/1997 | Hisamori et al. | 341/23 |
| 5,634,134 | 5/1997 | Kumai et al. | 395/798 |
| 5,717,425 | 2/1998 | Sasaki | 345/157 |
| 5,724,031 | 3/1998 | Huang | 341/28 |
| 5,791,992 | 8/1998 | Crump et al. | 463/41 |

*Primary Examiner*—Paul R. Lintz
*Assistant Examiner*—David Yiuk Jung
*Attorney, Agent, or Firm*—Workman, Nydegger, Seeley

[57] ABSTRACT

A Japanese character processing system containing an on-screen keyboard which includes an array of base Japanese kana characters of a first kana character set. The first selection of a character key causes the display of the character in base kana form. A second consecutive selection of the same key causes the display of the character in a first variant form. Subsequent consecutive selections of the character cause the display of the character in further variant forms. Variant forms may include voiced, aspirated, or subscripted versions of the base character. A further variant form may include the display of the character in an alternate kana character set.

30 Claims, 11 Drawing Sheets

| A | I | U | E | O |
|---|---|---|---|---|
| KA | KI | KU | KE | KO |
| SA | SHI | SU | SE | SO |
| TA | CHI | TSU | TE | TO |
| NA | NI | NU | NE | NO |
| HA | HI | FU | HE | HO |
| MA | MI | MU | ME | MO |
| YA | ----- | YU | ----- | YO |
| RA | RI | RU | RE | RO |
| WA | ----- | ----- | ----- | WO |
| N | | | | |
| GA | GI | GU | GE | GO |
| ZA | JI | ZU | ZE | ZO |
| DA | DI | DU | DE | DO |
| BA | BI | BU | BE | BO |
| PA | PI | PU | PE | PO |

Rows 1–11: 100
Rows 12–16: 110

FIG. 1

|     | YA  | YU  | YO  |
| --- | --- | --- | --- |
| KI  | KYA | KYU | KYO |
| GI  | GYA | GYU | GYO |
| SHI | SHA | SHU | SHO |
| JI  | JA  | JU  | JO  |
| CHI | CHA | CHU | CHO |
| NI  | NYA | NYU | NYO |
| HI  | HYA | HYU | HYO |
| BI  | BYA | BYO | BYU |
| MI  | MYA | MYU | MYO |
| RI  | RYA | RYU | RYO |

FIG. 2

|  |  | A | I | U | E | O |
|---|---|---|---|---|---|---|
| A |  | あ | い | う | え | お |
| K |  | か | き | く | け | こ |
| S |  | さ | し | す | せ | そ |
| T |  | た | ち | つ | て | と |
| N |  | な | に | ぬ | ね | の |
| H |  | は | ひ | ふ | へ | ほ |
| M |  | ま | み | む | め | も |
| Y |  | や | -- | ゆ | -- | よ |
| R |  | ら | り | る | れ | ろ |
| Wa, Wo, N |  | わ | を | ん | -- | -- |
| G | (VOICED "K") | が | ぎ | ぐ | げ | ご |
| Z | (VOICED "S") | ざ | じ | ず | ぜ | ぞ |
| D | (VOICED "T") | だ | ぢ | づ | で | ど |
| B | (VOICED "H") | ば | び | ぶ | べ | ぼ |
| P | (ASPIRATED "H") | ぱ | ぴ | ぷ | ぺ | ぽ |

FIG. 3

|   |   | A | I | U | E | O |
|---|---|---|---|---|---|---|
| A |   | ア | イ | ウ | エ | オ |
| K |   | カ | キ | ク | ケ | コ |
| S |   | サ | シ | ス | セ | ソ |
| T |   | タ | チ | ツ | テ | ト |
| N |   | ナ | ニ | ヌ | ネ | ノ |
| H |   | ハ | ヒ | フ | ヘ | ホ |
| M |   | マ | ミ | ム | メ | モ |
| Y |   | ヤ | -- | ユ | -- | ヨ |
| R |   | ラ | リ | ル | レ | ロ |
| Wa, Wo, N |   | ワ | ヲ | ン | -- | -- |
| G | (VOICED "K") | ガ | ギ | グ | ゲ | ゴ |
| Z | (VOICED "S") | ザ | ジ | ズ | ゼ | ゾ |
| D | (VOICED "T") | ダ | ヂ | ヅ | デ | ド |
| B | (VOICED "H") | バ | ビ | ブ | ベ | ボ |
| P | (ASPIRATED "H") | パ | ピ | プ | ペ | ポ |

JAPANESE TEXT INPUT METHOD USING A KEYBOARD WITH ONLY BASE KANA CHARACTERS

CROSS-REFERENCES TO RELATED APPLICATIONS

The present application is related to the following U.S. patent application:

U.S. patent application entitled, "Web Browser Allowing Navigation Between Hypertext Objects Using Remote Control," having application Ser. No. 08/660,088, and filed on Jun. 3, 1996; which is assigned to the assignee of the present invention.

FIELD OF THE INVENTION

The present invention relates generally to the field of electronic text entry, and more particularly to a method of entering Japanese characters into an electronic device.

BACKGROUND OF THE INVENTION

The Japanese written language contains three separate character sets. Simple Japanese characters representing phonetic syllables are represented by the hiragana and katakana character sets (together referred to as "kana"). Hiragana characters, which are characterized by a cursive style, are typically used for words native to Japan. Katakana characters, which are characterized by a more angular style, are typically used for words borrowed from other cultures, or for emphasis and sound effects. The third character set in Japanese is kanji. Kanji are the complex Japanese characters borrowed from the Chinese language. There are over 9000 kanji characters in the Japanese language. Approximately 4000 kanji are used on a semi-regular basis, while knowledge of 2000 kanji is generally required to read a newspaper or get around in Japan. One additional representation of written Japanese is the roman character or "romaji" character set. Romaji are romanized representations of Japanese words based on the sound of a character, and are typically used only to facilitate electronic input of Japanese characters in a computer, or to aid foreign students in the study of Japanese. The complexity of the Japanese written language poses several challenges for efficient text entry in computers, word processors, and other electronic devices.

Common methods of Japanese text entry for computers and like devices typically require the use of a standard Japanese character keyboard or a roman character keyboard which has been adapted for Japanese use. Both approaches, however, have several disadvantages. A disadvantage of the roman character keyboard approach is that often complex keystroke combinations must be mastered in order to generate the proper Japanese character, since an alphabetical arrangement of roman letters is not a natural order for entering Japanese text. A second disadvantage of this method is that the input romaji text must be converted to Japanese, thus imposing a processing overhead. A disadvantage of standard Japanese character keyboards is the high number of keys required to represent the basic Japanese character set.

The hiragana and katakana character sets each contain 46 base characters. Both sets of kana have identical pronunciations and rules of construction, only the shape of the characters are different to emphasize the different usage of the words. Some base kana characters are used in certain combinations and in conjunction with special symbols (called "nigori" and "maru") to produce voiced and aspirated variations of the basic syllables, thus resulting in a full character set for representing the approximately 120 different Japanese phonetic sounds. If a Japanese keyboard included separate keys for all of the voiced and aspirated variants of the basic syllables, the keyboard would need to contain at least 80 character keys. Such a large number of keys creates a crowded keyboard with keys which are often not easily discernible. If the nigori and maru symbol keys are included separately, the number of character keys can be reduced to 57 keys. However, to generate voiced or aspirated versions of a base character requires the user to enter two or more keystrokes for a single character. Another disadvantage of existing kana keyboards is that typically only one kana set (usually hiragana) may be input directly from the keyboard. Conversion to the other kana set requires a separate conversion operation, thus increasing processing overhead and user interaction. Thus, present methods of text entry through existing Japanese character keyboards involve keyboards which are overly complex and/or require a high degree of user interaction.

Many electronic devices are making increased use of on-screen or "virtual" keyboards to facilitate text entry. This is especially true with devices such as Personal Digital Assistants (PDA's), or computer or communications devices which feature minimal keyboards or keypads for text entry. On-screen keyboards are also used in computer-based communications systems in which a standard computer monitor and keyboard are not utilized. Examples of such systems include the Network Computer (NC) and similar dedicated network server systems. An on-screen keyboard is a picture of a keyboard with each key represented as a separate selectable graphic object. A cursor control device, such as an arrow button or similar directional control, is used to move a cursor or similar on-screen indicator to select a particular character. In a typical text entry situation, the cursor is moved to a desired key with the direction controls, and that key is then selected or entered using a separate button on the device. This process is then repeated for each letter in the word.

Existing systems which use a full Japanese character arrangement for on-screen keyboard implementations pose special problems because of the inherent display and text entry constraints of on-screen keyboards. For example, the implementation of a standard Japanese on-screen keyboard would may produce a crowded display of character keys which would be difficult to distinguish in a low-resolution or limited screen area.

It is therefore desirable to provide a system which allows the entry of Japanese kana characters into an electronic device with a keyboard which features a minimum number of Japanese characters, thereby reducing the display area occupied by the keyboard, minimizing required user input, and speeding the text entry process.

SUMMARY OF THE INVENTION

The present invention discloses a method and apparatus for entering Japanese characters into an electronic device using an on-screen keyboard containing base kana characters keys which provide access to all possible phonetic variations of the base character. The keyboard facilitates the entry of Japanese in kana form without requiring excessive user interaction.

A keyboard arrangement of the present invention contains only the base hiragana or katakana Japanese characters. Voiced, aspirated, subscripted, and alternate kana versions of a base character are produced by selecting the base character a specific number of consecutive times. According to one aspect of the present invention, the keyboard is displayed as an on-screen keyboard on a display device with the keys selected by an infra-red coupled remote control unit.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals indicate similar elements and in which.

DETAILED DESCRIPTION

Japanese is written with kanji (characters of Chinese origin) and two sets of phonetic kana symbols, hiragana and katakana. A single kanji character may contain one symbol or several symbols, and may, by itself, represent an entire word or object. Unlike kanji, kana have no intrinsic meaning unless combined with other kana or kanji to form words. Both hiragana and katakana contain 46 symbols each. Combinations and variations of the kana characters provide the basis for all of the phonetic sounds present in the Japanese language.

Figure 1:
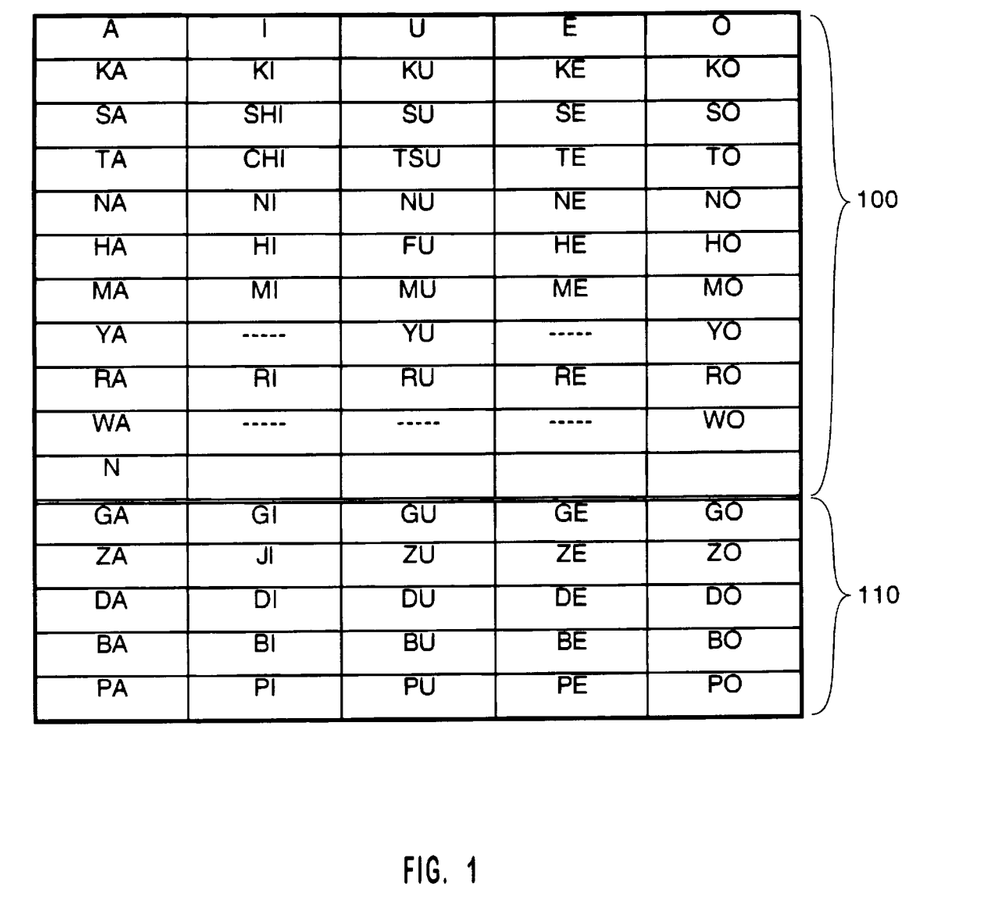
FIG. 1 illustrates the basic Japanese sounds represented by Japanese written characters.

The basic Japanese phonetic sounds are illustrated in Table 1 of FIG. 1. As can be seen in Table 1, the syllables comprising the Japanese sounds are based on the vowel group A, I, U, E, and O with accompanying consonants, such as K, S, T, N, and so on. The syllable group 100 are the syllables which are represented by the base kana characters. The syllable group 120 are the syllables which are represented by voiced and aspirated versions of the base kana characters.

Figure 2:
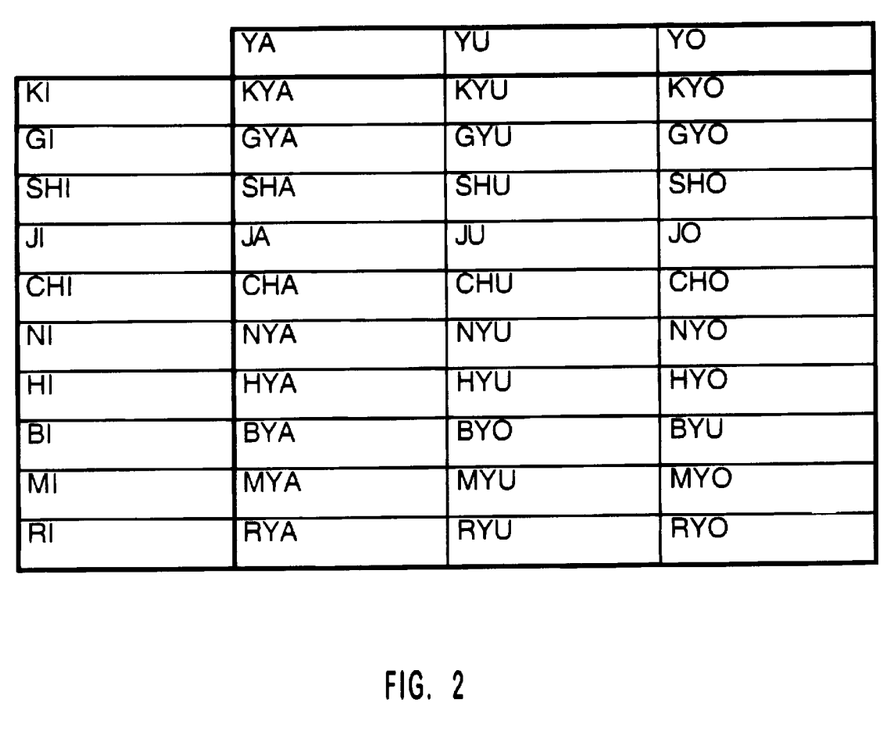
FIG. 2 illustrates additional Japanese sounds represented by Japanese written characters.

Japanese also contains a limited number of diphthongs which are formed by appending subscript versions of Ya, Yi, or Yu to certain base sounds to create the combined sounds. These diphthongs are listed in Table 2 of FIG. 2. As can be seen in Table 2, the combination of Ki+Ya forms Kya, Shi+Yu forms Shu, and so on. In the written representation, the Ya, Yu, or Yo are written or typed as subscripts following the base character.

Figure 3:
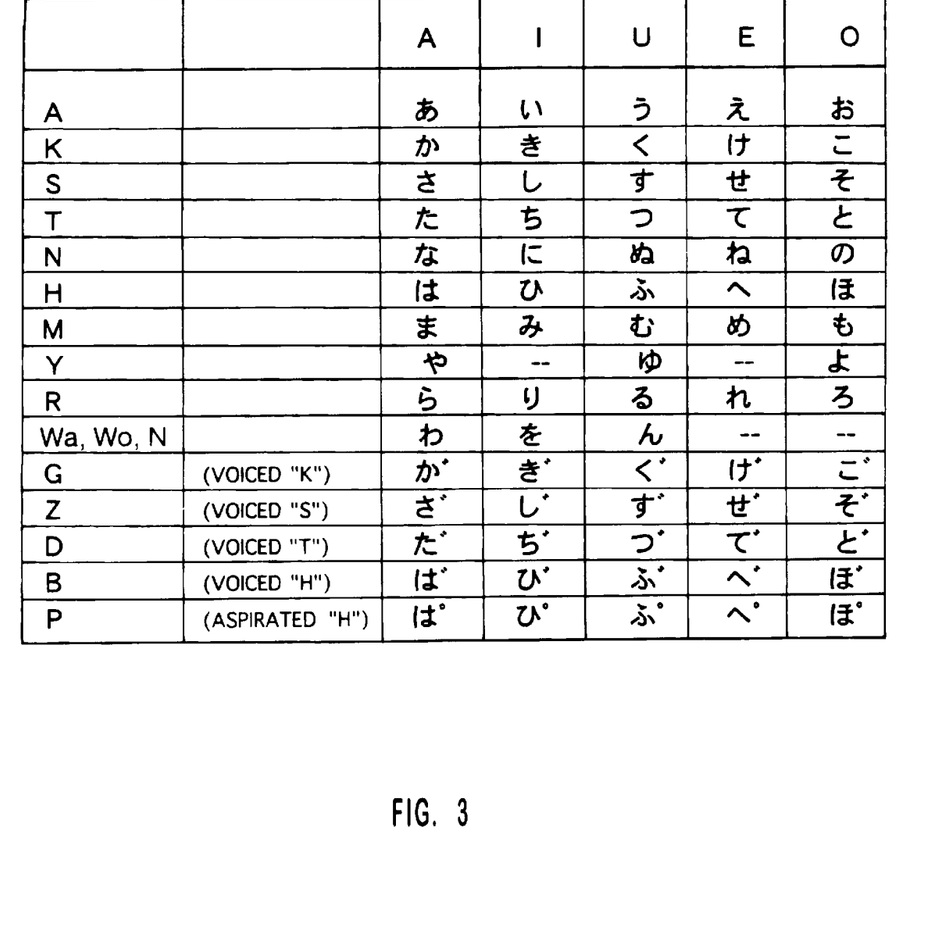
FIG. 3 illustrates the base Japanese hiragana characters, and voiced and aspirated variants of these characters.
Figure 4:
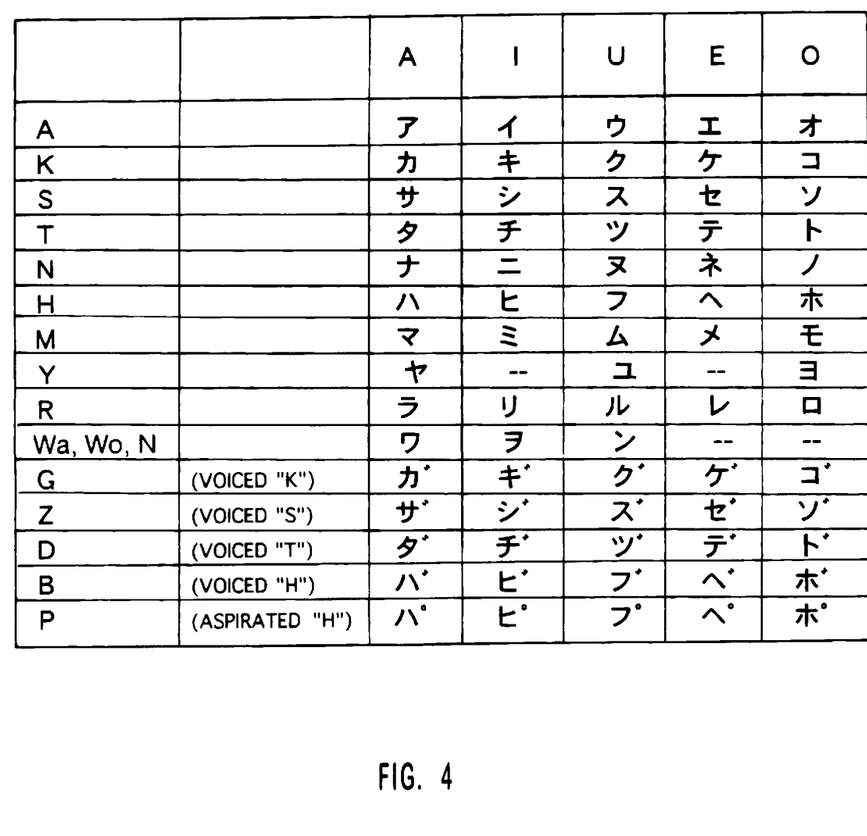
FIG. 4 illustrates the base Japanese katakana characters, and voiced and aspirated variants of these characters.

FIG. 3 illustrates the base Japanese hiragana character set with the voiced and aspirated variants of the base characters; and FIG. 4 illustrates the base Japanese katakana character set with the voiced and aspirated variants of the base characters. The group of characters which are denoted as voiced or aspirated in Table 3 and Table 4 correspond to the group 110 sounds in FIG. 1. As can be seen from either FIG. 3 or FIG. 4, the base kana characters are the characters for the phonetic sounds starting with A, K, S, T, N, H, M, Y, R, and the group Wa, Wo, and N. The voiced characters for the phonetic sounds starting with G, Z, D, and B are formed by adding a "nigori" or "tenten" symbol (") to particular base characters. Thus, K becomes G, S becomes Z, T becomes D, and H becomes B. The aspirated characters for the phonetic sounds starting with P are formed by adding "maru" (0) symbol to the base characters for H.

Further phonetic variations are formed by subscripting certain characters. For example, the diphthongs are produced by subscripted the Ya, Yu, and Yo characters. Another commonly subscripted character is the character for "Tsu". When used in conjunction with a vowel (A, I, U, E, O), a subscripted TSU indicates that the preceding syllable is to be pronounced in a clipped or emphasized manner.

Present Japanese text entry keyboards may include separate keys for most of the characters shown in FIG. 3 or FIG. 4, thus resulting in a complex keyboard with many character keys. Alternative keyboard arrangements may utilize character keys for the base kana characters with separate nigori and maru symbol keys for the voiced characters. This approach, however, forces the user to navigate the keyboard and enter multiple keystrokes for a single character.

A method of the present invention takes advantage of the fact that multiple entries of a base kana character can be used to generate all of the possible versions of that character, including voiced, aspirated, subscripted, and alternate kana versions of the character.

Figure 5:
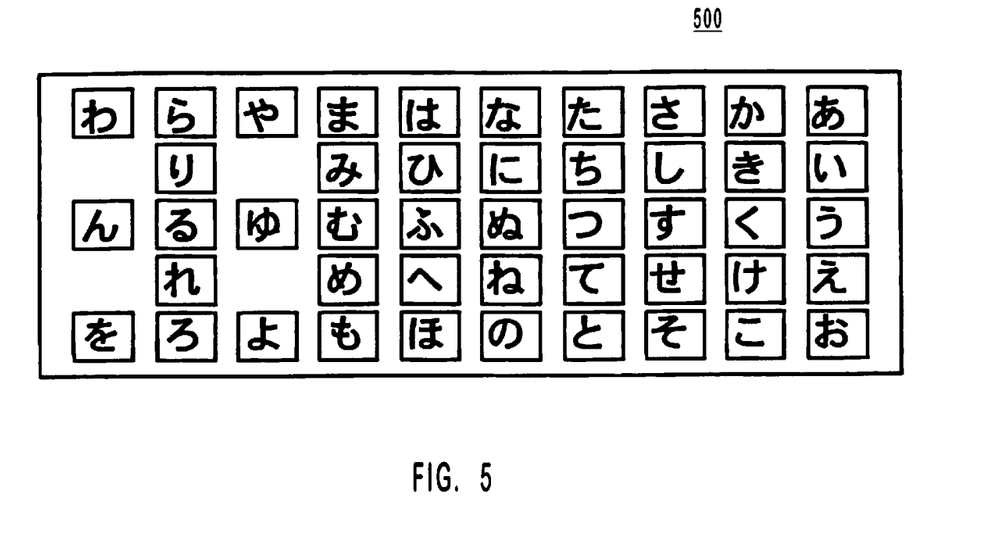
FIG. 5 illustrates a keyboard layout for the base kana keyboard according to one embodiment of the present invention.

FIG. 5 illustrates the keyboard arrangement of a base kana keyboard according to one embodiment of the present invention. On keyboard arrangement 500, only base hiragana characters are displayed. Keyboard 500 contains of the 46 base characters of the Japanese hiragana keyboard in text book order, i.e., the order taught in Japanese schools. The voiced and aspirated characters are not included in keyboard 500, nor are the subscript variations for the 9 characters that require them, nor are the nigori and maru symbol keys. In the embodiment of the present invention represented by keyboard 500, katakana characters are treated as a variation of the corresponding hiragana characters, therefore a direct katakana input mode is not required. It should be noted that in an alternative embodiment of the present invention, base katakana keys could be displayed on keyboard 500, with the hiragana characters treated as variations of the corresponding hiragana characters.

In order to enter variations of a base character, the base character is selected more than once in succession. In one embodiment of the present invention, the variations for a base character may include voiced, aspirated, sub-scripted, or katakana versions of the character. It will be clear to one familiar with written Japanese, that not all base characters have all of the possible variations available. For example, the kana character for 'Na' has no voiced, aspirated, or subscripted variation.

Using keyboard arrangement 500, the first selection of a character causes the base hiragana character to be displayed. Subsequent consecutive selections of the same character will cause any available variants of the base character to be displayed. Thus, continued selection of a base character cycles through all possible variants, and then repeats from the original character. In one embodiment of the present invention, the variants are displayed in the following order: base, voiced, aspirated, sub-script, katakana base, katakana voiced, katakana aspirated, and katakana sub-script. If a particular variation is not valid for a given character, then it is not available to be displayed.

Table 5 below provides an example of the selection of various characters based on a base kana character. Table 5 illustrates the selection of alternate characters based upon the character 'Ha'.

TABLE 5

| Number of Selections | Result |
| --- | --- |
| press "ha" 1 times | hiragana "ha" |
| press "ha" 2 times | hiragana "ba" |
| press "ha" 3 times | hiragana "pa" |
| press "ha" 4 times | katakana "ha" |
| press "ha" 5 times | katakana "ba" |
| press "ha" 6 times | katakana "pa" |

Unlike the character 'Ha', which has six variants available, many other characters have only the katakana version available as a variation. For example, for the character 'Na', a first selection of its key would cause the display of the hiragana 'Na', a second consecutive selection would cause the display of the katakana 'Na, and a third consecutive selection would cause the re-display of the hiragana 'Na'.

To simplify entry of katakana characters, which are normally used for entire words or phrases, as opposed to single characters, the present invention features an automatic mode switch. The selection of a katakana variation for a character will cause the next character selected to be displayed in its katakana variation rather than in its base hiragana form. This will continue to be the case until one of the hiragana variations is selected for a key, after which the normal mode where the base hiragana is the first character displayed will resume.

The entry of two or more consecutive characters derived from the same base character normally requires multiple selections of a single key. However, the system of the present invention causes multiple selections of a single key to cycle through the variations of that character instead of displaying the same character multiple times. In one embodiment of the present invention, multiple successive entries of the same character is performed by selecting the character a first time, selecting (but not entering) a different character, and then re-selecting the first character a second time. Thus, when the first character is selected again, it is treated as a new separate character (which can then be cycled to an alternate variation as well). This allows the multiple entry of characters with only two additional user interactions (e.g., moving a cursor off of and then back onto the key). For example, to type two consecutive identical characters (e.g., "tatami"), enter the first character 'Ta', move the cursor to another key and then back to 'Ta', then select 'Ta' again before selecting 'Mi' to complete the word In an alternate embodiment of the present invention, an additional key may be added to the input device to distinguish the selection of a character key as opposed to a selection of a variation of the character. Such a key could be used to distinguish the function of a key selection and would eliminate the need to move the cursor off of a key to enter consecutive characters derived from the same base character. However, this method would require the addition of an additional key.

In a further embodiment of the present invention, the function of a key selection is determined by the duration of a keystroke. For example, an auto-repeat function provides that a short press on the selection button selects the base form of the character, which would be either hiragana or katakana depending on how the previous character was displayed. If the selection button is held down for a certain length of time, the character would begin cycling through the variations and stop at the version displayed when the button is released.

The present invention allows the entry of Japanese text with a smaller array of keys and without the need to move the cursor to modifier keys in order to enter characters derived from the base set. This reduced set of keys produces a more easily readable keyboard, especially if the keyboard is a virtual or on-screen keyboard displayed on a display device. The keyboard arrangement of the present invention also reduces the total number key presses since variations of a certain base kana character are accessible through subsequent entries of the that same key rather than through the selection of an additional separate key. Thus, key presses required to navigate around an on-screen keyboard are minimized.

WebTV System

The present invention is included in a system known as WebTV™, which uses a standard television set as a display device for browsing the web and which connects to a conventional network, such as the Internet, using standard telephone, Integrated Services Digital Network (ISDN), or similar communication lines (WebTV™ is a trademark of WebTV Networks, Inc. of Palo Alto, Calif.). In accordance with the present invention, a user of a WebTV™ client system can utilize WebTV™ network services provided by one or more remote WebTV™ servers. The WebTV™ network services can be used in conjunction with software running in a WebTV™ client system to browse the web, send electronic mail, and to make use of the Internet in various other ways.

In one embodiment, the steps of the present invention are embodied in machine-executable instructions. The instructions can be used to cause a general-purpose or special-purpose processor which is programmed with the instructions to perform the steps of the present invention. Alternatively, the steps of the present invention may be performed by specific hardware components that contain hardwired logic for performing the steps, or by any combination of programmed computer components and custom hardware components.

Figure 6:
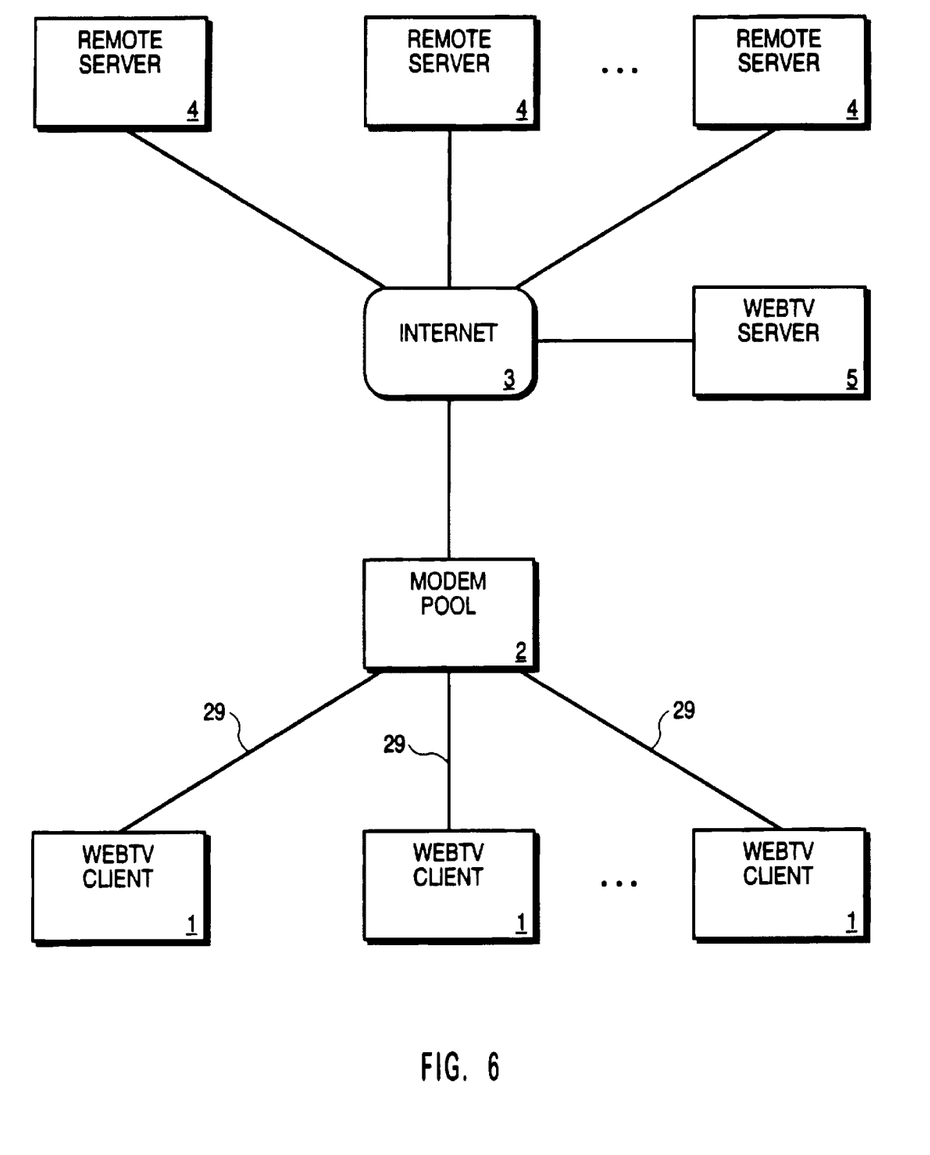
FIG. 6 illustrates several client systems connected to a server system for utilization of Japanese character input.

FIG. 6 illustrates a basic configuration of the WebTV™ network according to one embodiment. A number of WebTV™ clients 1 are coupled to a modem pool 2 via direct-dial, bidirectional data connections 29, which may be telephone, ISDN, or any other similar type of connection. The modem pool 2 is coupled typically through a router to a number of remote servers 4 via a conventional network infrastructure 3, such as the Internet. The WebTV™ system also includes a WebTV™ server 5, which specifically supports the WebTV™ clients 1. The WebTV™ clients 1 each have a connection to the WebTV™ server 5 either directly or through the modem pool 2 and the Internet 3. Note that the modem pool 2 is a conventional modem pool, such as those commonly providing access to the Internet and private networks.

Client System Architecture

Figure 7:
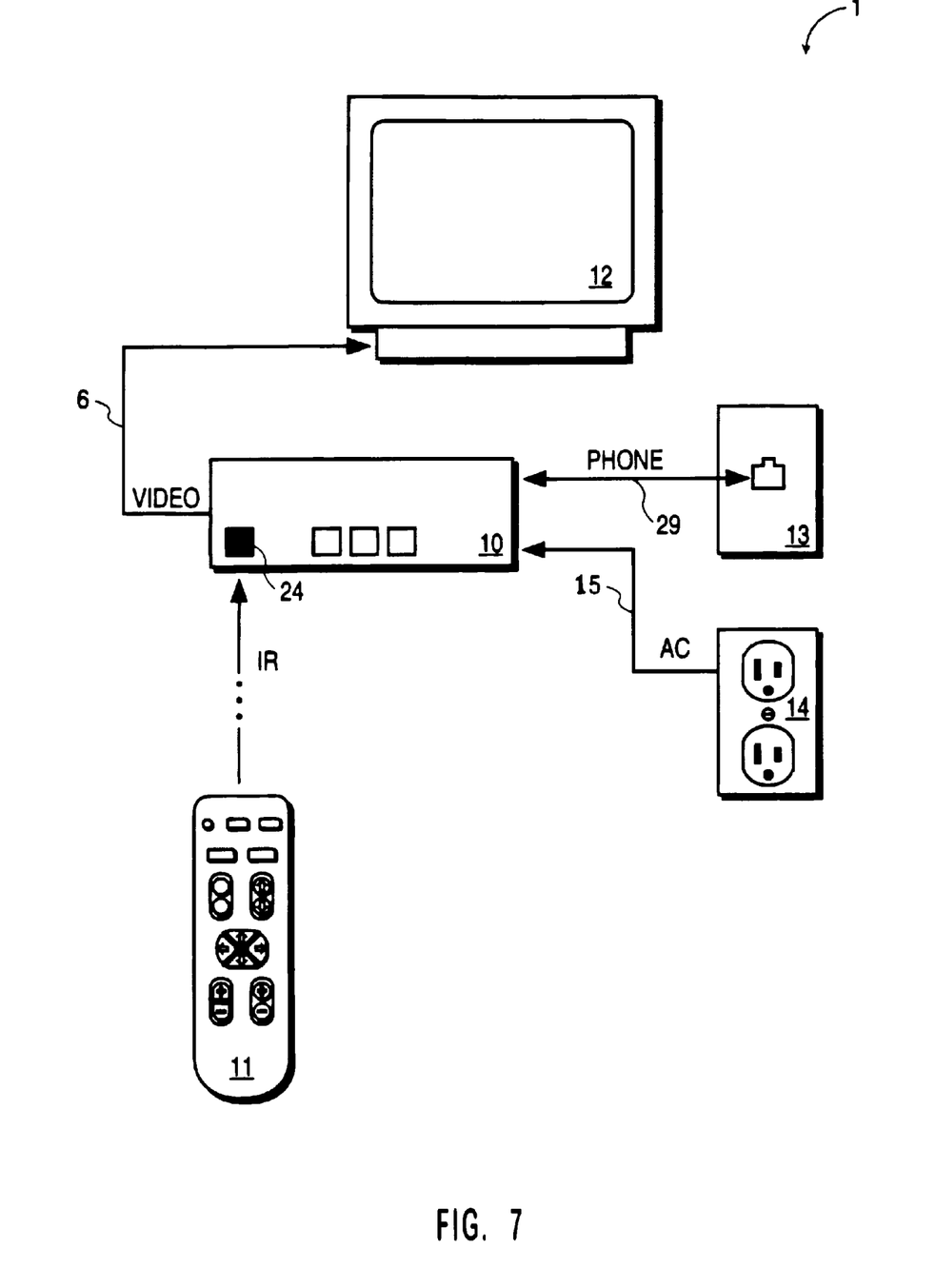
FIG. 7 is a block diagram of a client system of FIG. 6.

FIG. 7 illustrates a WebTV™ client 1. The WebTV™ client 1 includes an electronics unit 10 (hereinafter referred to as "the WebTV™ box 10"), an ordinary television set 12, and a remote control 11. In an alternative embodiment of the present invention, the WebTV™ box 10 is built into the television set 12 as an integral unit. The WebTV™ box 10 includes hardware and software for providing the user with a graphical user interface, by which the user can access the WebTV™ network services, browse the web, send e-mail, and otherwise access the Internet.

The WebTV™ client 1 uses the television set 12 as a display device. The WebTV™ box 10 is coupled to the television set 12 by a video link 6. The video link 6 is an RF, S-video, composite video, or other equivalent form of video link. The communication link 29 between the WebTV™ box 10 and the WebTV™ server 5 is either a telephone connection 29a or an ISDN connection 29b. The WebTV™ box 10 receives AC (alternating current) power through an AC power line 15.

Remote control 11 is operated by the user in order to control the WebTV™ client 1 in browsing the web, sending e-mail, moving a cursor and selecting characters on on-screen keyboards, and performing other Internet related functions. The WebTV™ box 10 receives commands from remote control 11 via an infrared (IR) communication link. In alternative embodiments, the link between the remote control 11 and the WebTV™ box 10 may be RF or any equivalent mode of transmission, and remote control 11 may be configured to control television set 12 through link 13.

The WebTV™ box 10 includes application software which, when executed by a processor in the box 10, provides the user with a graphical user interface by which the user can access the WebTV™ network services and browse the web. The application software is automatically executed upon application of power to the WebTV™ box 10.

Figure 8:
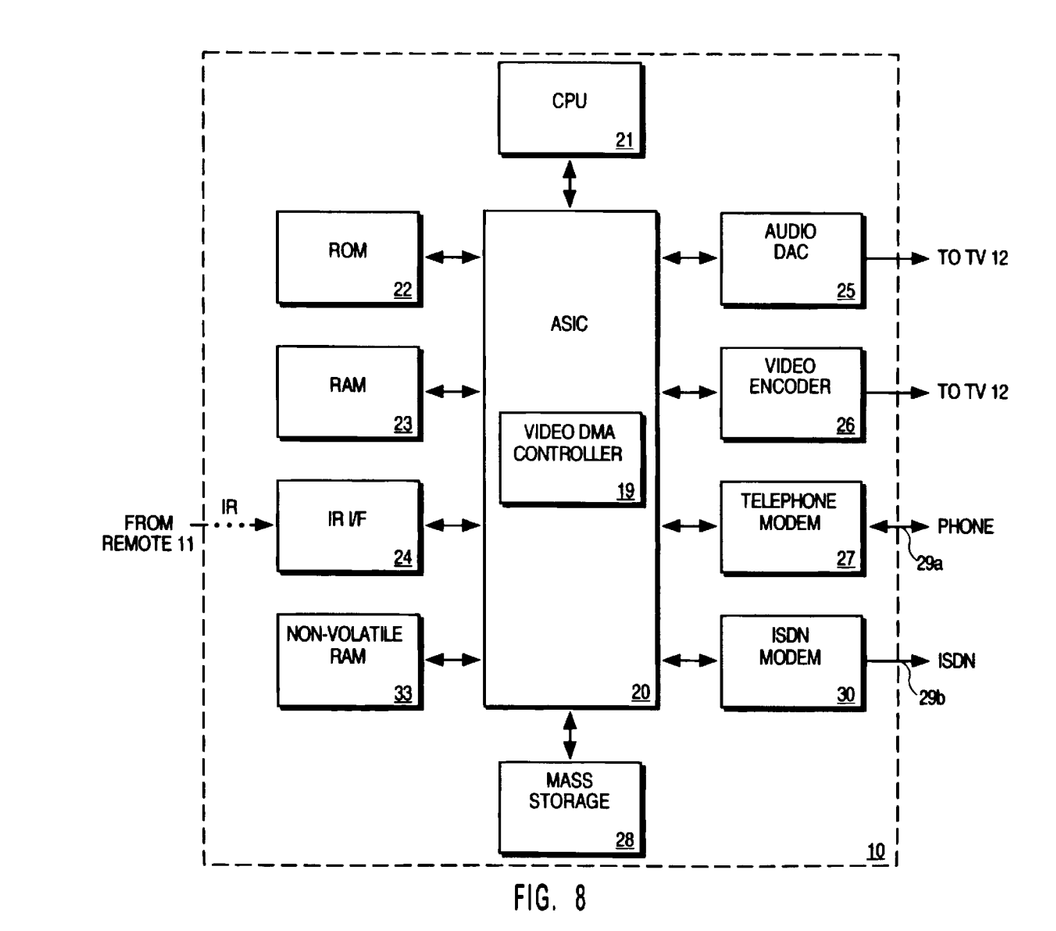
FIG. 8 is a block diagram of an electronics unit used to implement a web browser on the client system of FIG. 7 according to one embodiment of the present invention.

FIG. 8 is a block diagram of the internal features of the WebTV™ box 10. Operation of the WebTV™ client 1 is controlled by a central processing unit (CPU) 21 which is coupled to an Application-Specific Integrated Circuit (ASIC) 20. The CPU 21 executes software designed to implement features of the present invention. ASIC 20 contains circuitry which may be used to implement certain features provided by the WebTV™ client 1. ASIC 20 is coupled to an audio digital-to-analog converter 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. A standard telephone modem 27 and an ISDN modem 30 are coupled to ASIC 20 to provide connections 29a and 29b, respectively, to the modem pool 2 and, via the Internet 3, to the remote servers 4. Note that the WebTV™ box 10 also may include a cable television modem (not shown).

Also coupled to ASIC 20 is Read-Only Memory (ROM) 22, which provides storage of program code for implementing the application software to be executed by the WebTV™ box 10. Note that ROM 22 may be a programmable ROM (PROM) or any form of erasable PROM (EPROM) or Flash memory. Further coupled to ASIC 20 is Random Access Memory (RAM) 23. A mass storage device 28 may optionally be provided and coupled to ASIC 20. The mass storage device 28 may be used to input software or data to the client or to download software or data received over network connection 29. The mass storage device 28 includes any suitable medium for storing machine-executable instructions, such as magnetic disks, optical disks, and the like. ASIC 20 contains a video DMA (direct memory access) controller 19 which transfers pixel information comprising the displayable images from memory to video encoder 26 for display on television 12.

Application Software

Figure 9:
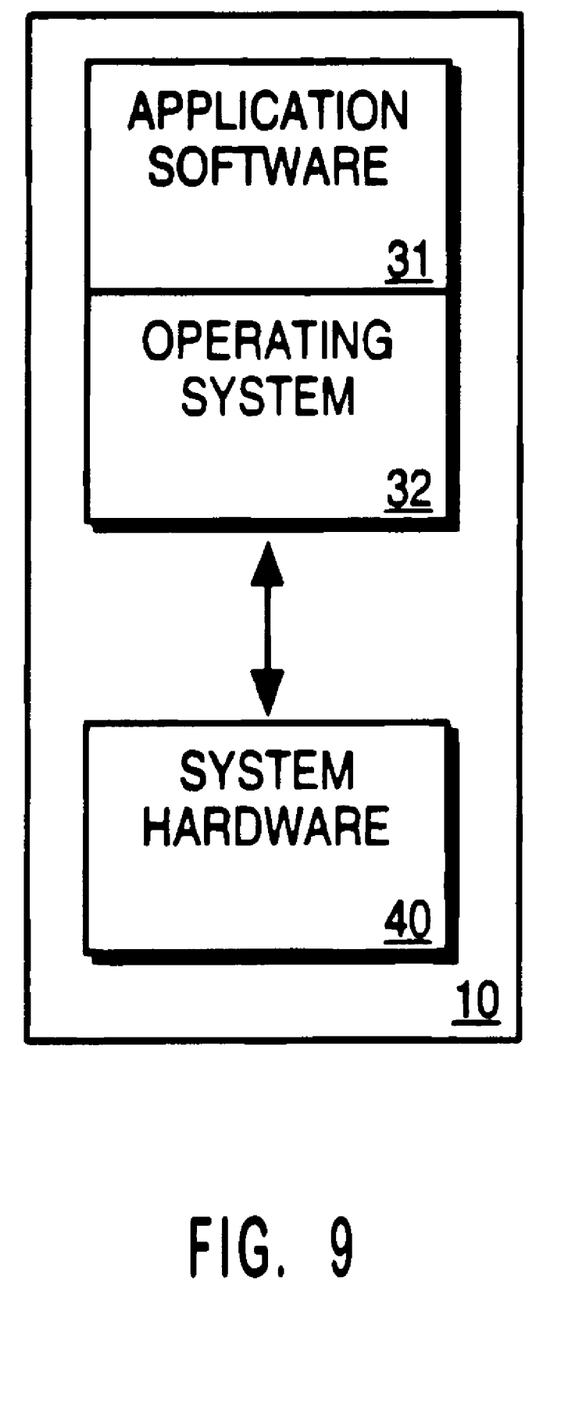
FIG. 9 is a block diagram of web browser application software according to one embodiment of the present invention.

As mentioned above, the WebTV™ box 10 includes application software including a web browser. Referring now to FIG. 9, the above-mentioned application software 31 operates in conjunction with operating system (OS) software 32. The OS software 32 includes various device drivers and otherwise provides an interface between the application software 31 and the system hardware components 40 (i.e., the elements illustrated in FIG. 8).

In the preferred embodiment, the application software 31 and OS software 32 are stored in ROM 22. It will be recognized, however, that either or both of application software 31 and OS software 32 can be stored on any suitable storage medium, including magnetic or optical storage devices.

Figure 10:
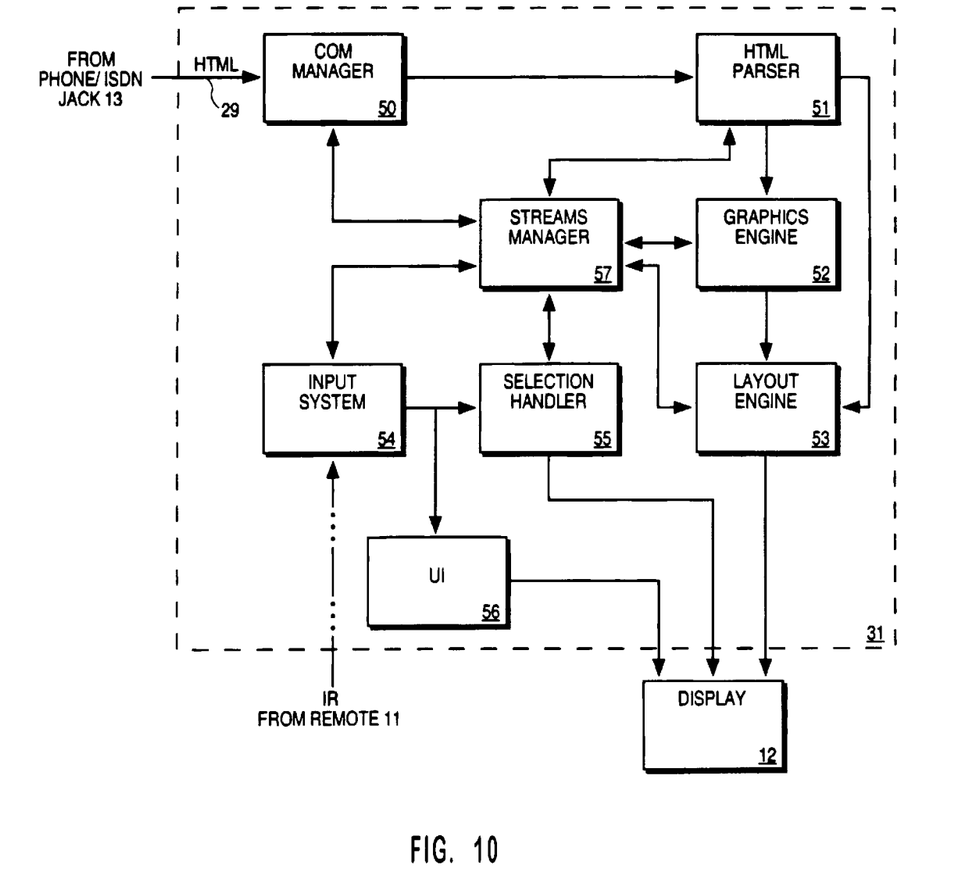
FIG. 10 illustrates the functional relationship between hardware and software in the client processing system of FIG. 8.

The Japanese text input functions of the present invention are implemented by application software 31. FIG. 10 illustrates the functional relationships between the various components of application software 31. Application software 31 includes a communications manager 50, an HTML (Hypertext Mark-up Language) parser 51, a graphics engine 52, a layout engine 53, an input system 54, a user interface 56, a selection handler 55, and a streams manager 57. The client system receives web pages over network connection 29 in the form of HTML documents. Streams manager 57 controls and coordinates movement of data throughout the system.

Each HTML document is initially input to communications manager 50. Communications manager 50 performs functions necessary to receive an HTML document over network connection 29, including handling high-level communications protocols, such as HTTP (Hypertext Transport Protocol), TCP/IP (Transmission Control Protocol/Internet Protocol), among others. A received HTML document is provided by communications manager 50 to HTML parser 51. HTML parser 51 converts HTML page descriptions to a displayable format for the display 12 on a client system. Image information, such as JPEG or GIF image information, are provided by HTML parser 51 to layout engine 53 via a graphics engine 52, which is responsible for measuring and drawing images.

In the course of browsing through a displayed graphic or web page, the user activates buttons on remote control 11, which transmit IR signals to WebTV™ box 10. Input system 54 records these inputs and provides them to selection handler 55 and user interface 56. Remote control 11 provides cursor direction control buttons (up, down, left, and right) which control the positioning of a cursor or other objects on the display. Input system 54 can also handle input queuing and processing of inputs from various other input devices, such as a keyboard coupled to WebTV™ box 10 through either a standard hardwire link or an IR link. Other aspects of the web browser which are visible to the user are provided by user interface 56 based on signals received from input system 54.

On-Screen Keyboard

Figure 11:
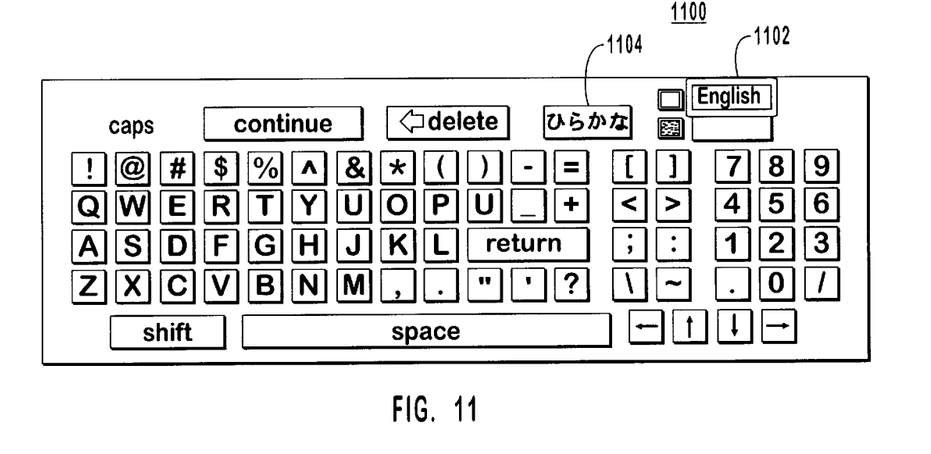
FIG. 11 illustrates an on-screen English language keyboard for a web browser which provides access to a base kana keyboard.

In one embodiment of the present invention, the WebTV™ system provides on-screen keyboards which provide for the entry of Japanese characters. FIG. 11 illustrates the English keyboard which is used with the WebTV™ system. English keyboard 1100 is a standard PC-style QWERTY keyboard with the addition of one or more special keys. The English selection key 1102 selects the standard English keyboard 1100. The Japanese selection key 1104 selects the on-screen base kana keyboard illustrated in FIG. 12. It should be noted that the on-screen keyboards embodied within the present invention may be provided either in the form of web pages provided by WebTV™ box 10, or in the form of graphics objects provided locally by the application software.

Figure 12:
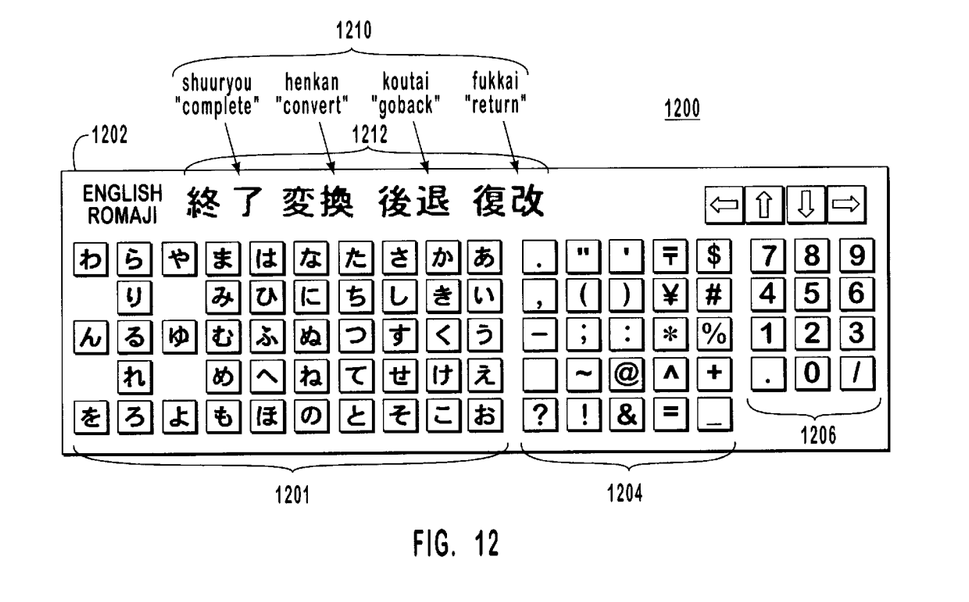
FIG. 12 illustrates a base kana keyboard for Japanese text entry according to one embodiment of the present invention.

FIG. 12 illustrates the base kana keyboard according to one embodiment of the present invention. This keyboard uses a layout based on the "50-sounds" array used in Japanese education for representing the characters (similar to alphabetical order for English) as well as numeric digits and basic punctuation. Base kana keyboard 1200 includes several groups of keys. The first group of keys 1201 are the kana character keys for the input of Japanese characters. Group 1201 corresponds to the key arrangement 500 illustrated in FIG. 5. Base kana keyboard 1200 also includes punctuation keys 1204 which allow for the input of punctuation symbols and special characters which are common in Japanese usage, and a numeric keypad 1206. Keyboard 1200 also includes function keys 1210 displayed along the top of the keyboard. The function key labeled 'henkan' (convert) 1212 allows the conversion of either a katakana or hiragana Japanese word into the kanji equivalent. Selection key 1202 labeled 'ENGLISH', provides access back to the standard English keyboard 1100 illustrated in FIG. 11.

On keyboard 1200, a user inputs a Japanese character or word by placing the cursor over the appropriate key using the direction keys provided on remote control unit 11, and moving the cursor among the keys for selection of the appropriate kana character. In one embodiment of the present invention, remote control unit 11 contains four cursor control buttons. A left arrow button moves the cursor left on the keyboard, an up arrow button moves the cursor up on the keyboard, a down arrow button moves the cursor down on the keyboard, and a right arrow button moves the cursor right on the keyboard. The cursor is moved from among the characters by simply pressing the appropriate direction buttons. The desired character is selected to be displayed by depressing an 'ENTER' key on remote control 11. Variations of the base character are accessed by re-selecting the same key. In one embodiment of the present invention, the cursor may only be moved sequentially from one key to an adjacent key on keyboard 1200. For example, if the cursor is on the character 'Ka' and the user desires to move to the character 'I', the user would need to depress the right arrow button on remote control 11 once to move to the character 'A' and then depress the down arrow button once to move to the character 'I'.

Depending on the implementation of the on-screen keyboard, the cursor may be displayed on a key in the form of a selection box or window, a highlight, reverse graphic, or any similar indication. Similarly a key which has been selected for input may be displayed in a highlighted form to differentiate it from non-selected keys. Likewise, it should be noted that keyboard 1200 may also include additional function keys other than those illustrated, to provide further functionality. For example, Keyboard 1200 may include an input style key (or keys) which control the style of the base character displayed by the keyboard. Such a function could cause the characters to be displayed in base form as either hiragana or katakana characters.

In one embodiment of the present invention, the on-screen keyboard of FIG. 12 is provided on a text entry screen which contains a text-entry field which displays the Japanese characters as they are entered. A character is displayed in the text entry field when the ENTER key on remote control 11 is pressed. When the ENTER key is depressed again for that character, the character in the text field is modified to its next variation.

It will be appreciated that the arrangement of the keys presented in FIG. 5 and on keyboard 1200 minimizes the number of keystrokes required to input Japanese words and phrases in kana, since the keys are arranged in the standard textbook format. In most current Japanese keyboards, display of variants of the base kana characters typically requires selection of additional keys (such as maru or nigori). On an on-screen keyboard this entails moving the cursor from the base character to the appropriate symbol. The present invention, however, eliminates the need for moving the cursor from one character to another to form a variant form of a character, since multiple keystrokes on a single base character generate all the variations of that character.

Once the appropriate kana characters have been entered for a particular word or phrase, the kana can be converted to kanji. The convert key 1212 provides access to a kana to kanji conversion program. In one embodiment of the present invention, WebTV™ box 10 contains the appropriate kanji conversion program to provide the conversion of the input katakana or hiragana to kanji characters upon selection of the Henkan or convert button 1212.

Although keyboards 1100 and 1200 have been disclosed as on-screen or virtual keyboards, in an alternative embodiment of the present invention these keyboards could also be provided as physical character input devices or hard keyboards. In this case, layout of the keys of the keyboard may be similar or identical to the graphical layout of the keys shown for keyboards 1100 and 1200 in FIGS. 11 and 12, respectively. If provided as hard keyboards, the keyboards would interface with WebTV™ box 10 through the appropriate input/output port. Such an input/output port would be coupled to ASIC 20 and CPU 21 illustrated in FIG. 8. Alternatively, hard keyboards for keyboards 1100 and 1200 could be provided in the form of an IR link to port 24 on WebTV™ box 10 just as remote control 11 is coupled through an IR link to WebTV™ box 10.

In a further alternative embodiment of the present invention, the base kana keyboard may be provided in a touch-screen display system in which the keys of the keyboard are selected by touching the keys on a touch sensitive display screen.

Keyboard Screen Authoring

In one embodiment of the present invention, the WebTV™ web browser screens are created using standard HTML command structures well known to those skilled in the art. Similarly, each of the available on-screen keyboard screens are also produced by constructing HTML objects and program links. Various different page formats and sequences may be utilized to achieve the present invention. Each of the keys and control buttons in the on-screen base kana keyboard 1200, as well as the control and link buttons in other keyboard pages, are graphics objects embedded within their pages through standard HTML object or function calls.

According to another embodiment, the on-screen keyboard screens, including the on-screen base kana keyboard screen 1200 can be produced using bit-mapped images or standard graphic format images, and displayed on a display device through a network interface, or over a broadcast signal. In such embodiments these screens need not be web pages accessed from the World-Wide Web using a web browser, but instead could be images of the type normally created, transmitted and displayed within the system in which the display device is typically used, such as a Local Area Network for a computer display, or a broadcast system for a television. In yet another embodiment, the on-screen keyboards could programmed into the display device as a built-in feature and accessed through a dedicated control button or on-screen menu.

Thus, a method and apparatus have been described for allowing a user to enter Japanese text on an on-screen keyboard with a minimum amount of directional control input. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus for entering Japanese text comprising:
a processor;
a display device coupled to said processor;
a cursor control device coupled to said processor;
a keyboard coupled to said processor, said keyboard containing Japanese kana character keys representing base kana characters of a kana character set, a subset of said Japanese base kana characters capable of being displayed in one or more variations, said keyboard configured such that
a first selection of a character key of said Japanese kana character keys causes the display on said display device of a base kana character corresponding to said character key, and
a subsequent consecutive selection of said character key causes the display on said display device of a variant form of said base kana character.

2. The apparatus of claim 1 wherein said variant form of said base kana character may include one of the following variations of said base character: a voiced form, an aspirated form, or a subscripted form.

3. The apparatus of claim 2 wherein said voiced form is represented by said base kana character displayed with a Japanese nigori mark; and said aspirated form is represented by said base kana character displayed with a Japanese maru mark.

4. The apparatus of claim 2 wherein said variant form of said base kana character includes representation of said base kana character in an alternate kana character set.

5. The apparatus of claim 4 wherein said kana character set is the hiragana character set, and said alternate kana character set is the katakana character set.

6. The apparatus of claim 4 wherein said kana character set is the katakana character set, and said alternate kana character set is the hiragana character set.

7. The apparatus of claim 4 wherein selection of a base kana character in said alternate kana character set causes a first selection of the next character selected from said kana character set to be displayed in said alternate character set form.

8. The apparatus of claim 4 wherein said keyboard is an on-screen keyboard displayed on said display device.

9. The apparatus of claim 8 wherein said cursor control device is a remote control device remotely coupled to said processor, said remote control device containing direction keys for the control of said cursor on said on-screen keyboard.

10. The apparatus of claim 8 wherein said on-screen keyboard comprises a screen image displayed through an interactive display environment including World-Wide Web content.

11. The apparatus of claim 10, wherein said on-screen keyboard is a Hypertext Mark-up Language (HTML) object.

12. The apparatus of claim 11, wherein said display device is a television.

13. The apparatus of claim 8 wherein said on-screen keyboard comprises a graphic image stored in a memory coupled to said processor.

14. The apparatus of claim 4, further including a conversion button selectable by said cursor control device, selection of said conversion button causing said processor to convert said Japanese character from a character in said kana character set into a corresponding Japanese kanji character.

15. A method of displaying Japanese characters on a display device, said display device coupled to a processor, said method comprising the steps of:
providing a keyboard, said keyboard containing Japanese kana character keys representing base kana characters of a kana character set, a subset of said Japanese base kana characters capable of being displayed in one or more variations, said keyboard configured such that
a first selection of a character key of said Japanese kana character keys causes the display on said display device of a base kana character corresponding to said character key, and
a subsequent consecutive selection of said character key causes the display on said display device of a variation of said base kana character;
receiving an input signal from said keyboard, said input signal specifying a Japanese kana character to be displayed; and
displaying said Japanese kana character on said display device.

16. A method according to claim 15, wherein said step of providing a keyboard comprises the step of displaying a text entry screen on said display device, said text entry screen containing an on-screen keyboard representing said keyboard.

17. A method according to claim 16, further comprising the step of providing a cursor control device, said cursor control device being a remotely controlled device containing direction keys for the control of said cursor on said on-screen keyboard, and said input signal is produced by selection of one of said one or more direction controls by a user, said input signal causing the movement of a selection window on said on-screen keyboard, said selection window indicating a kana character which is to be entered.

18. A method according to claim 17, wherein a character of said plurality of characters is selected by positioning said selection window over said character and activating an input button on said cursor control device.

19. A method according to claim 18 wherein said text entry screen comprises a screen image displayed through an interactive display environment including World-Wide Web content.

20. In a client system in communication with at least one remote server system, an apparatus for displaying Japanese characters on a display device through an interactive display environment, the apparatus comprising:
means for displaying a text entry screen on said display device, said text entry screen containing an on-screen keyboard;
means for controlling a cursor on said text entry screen;

means for determining a first selection of a character on said on-screen keyboard, said first selection causing the display of said character in a base kana form;

means for determining a subsequent consecutive selection of said character on said on-screen keyboard, said subsequent consecutive selection causing the display of said character in a variant form of said base kana form; and means for displaying said selected Japanese character on said display device.

21. A client system according to claim 20, wherein said on-screen keyboard contains Japanese kana character keys representing base kana characters of a kana character set, a subset of said Japanese base kana characters capable of being displayed in said variant form.

22. A client system according to claim 21, wherein said means for controlling a cursor control comprises a cursor control unit remotely coupled to said display device, said cursor control unit containing one or more direction controls, and wherein selection of one of said one or more direction controls causes a selection field to move on said keys of said on-screen keyboard.

23. A client system according to claim 22, wherein said variant form of said base kana character may include one of the following variations of said base character: a voiced form, an aspirated form, or a subscripted form.

24. A client system according to claim 23, wherein said variant form of said base kana character includes representation of said base kana character in an alternate kana character set.

25. A client system according to claim 24, wherein said on-screen keyboard comprises a screen image displayed through an interactive display environment including World-Wide Web content.

26. A client system according to claim 25, wherein said on-screen keyboard is a Hypertext Mark-up Language (HTML) object.

27. A client system according to claim 26, wherein said display device is a television.

28. A client according to claim 24 wherein said on-screen keyboard comprises a graphic image stored in a memory coupled to said processor.

29. An article of manufacture embodying a program of instructions executable by a machine to display Japanese characters on a display device coupled to said machine, the program of instructions including instructions for:

providing an on-screen keyboard, said keyboard containing Japanese kana character keys representing base kana characters of a kana character set, a subset of said Japanese base kana characters capable of being displayed in one or more variations, said keyboard configured such that a first selection of a character key of said Japanese kana character keys causes the display on said display device of a base kana character corresponding to said character key, and a subsequent consecutive selection of said character key causes the display on said display device of a variation of said base kana character;

receiving an input signal from said keyboard, said input signal specifying a Japanese kana character to be displayed; and displaying said Japanese kana character on said display device.

30. An article of manufacture according to claim 29, wherein said program of instructions further includes instructions for receiving one or more direction controls, said direction controls produced by a cursor control device remotely coupled to said display device, and said direction controls causing the movement of a selection window on said on-screen keyboard.

* * * * *

UNITED STATES PATENT AND TRADEMARK OFFICE
CERTIFICATE OF CORRECTION

PATENT NO. : 5,999,950
DATED : Devember 7, 1999
INVENTOR(S) : Mark Henry Krueger, Kevin Daniel Neeson It is certified that error appears in the above-identified patent and that said Letters Patent are hereby corrected as shown below:

Col. 4, ln. 21: after ""maru"" change "(0)" to --(o)--

Col. 5, ln. 24: after ""ha" 1" change "times" to --time.--

Col. 6, ln. 27: after "number" and before "key" inset --of--

Col. 6, ln. 29: after "entries of" and before "that same" delete [the]

Col. 11, ln. 9: after "could" and before "programmed" insert --be--

Signed and Sealed this

Tenth Day of April, 2001

Attest:

NICHOLAS P. GODICI

Attesting Officer    Acting Director of the United States Patent and Trademark Office